United States Patent
Combs

(10) Patent No.: US 12,276,434 B2
(45) Date of Patent: Apr. 15, 2025

(54) FIXED PLUG FOR USE IN A PROCESS OF FORMING AN INSULATED REGISTER BOX

(71) Applicant: STERLING CUSTOM SHEET METAL, INC., Magnolia, TX (US)

(72) Inventor: Sterling Kidd Combs, Magnolia, TX (US)

( * ) Notice: Subject to any disclaimer, the term of this patent is extended or adjusted under 35 U.S.C. 154(b) by 999 days.

(21) Appl. No.: 17/196,678

(22) Filed: Mar. 9, 2021

(65) Prior Publication Data

US 2021/0262693 A1  Aug. 26, 2021

Related U.S. Application Data

(60) Continuation-in-part of application No. 17/175,956, filed on Feb. 15, 2021, now Pat. No. 12,104,820, which is a continuation-in-part of application No. 17/175,922, filed on Feb. 15, 2021, now Pat. No. 12,000,613, which is a continuation-in-part of application No. 17/171,638, filed on Feb. 9, 2021, now Pat. No. 12,083,716, which is a continuation-in-part of application No. 16/036,059, filed on Jul. 16, 2018, now Pat. No. 11,060,756, which is a continuation-in-part of application No. 16/005,235, filed on Jun. 11, 2018, now Pat. No.

(Continued)

(51) Int. Cl.
*B29C 44/18* (2006.01)
*B29C 41/20* (2006.01)
*B29C 44/36* (2006.01)
*B29K 75/00* (2006.01)
*B29K 105/00* (2006.01)
*F24F 13/06* (2006.01)
*F24F 13/08* (2006.01)

(52) U.S. Cl.
CPC ............ *F24F 13/082* (2013.01); *B29C 41/20* (2013.01); *B29C 44/18* (2013.01); *F24F 13/06* (2013.01); *B29C 44/36* (2013.01); *B29K 2075/00* (2013.01); *B29K 2105/0058* (2013.01); *B29K 2995/0015* (2013.01); *Y10T 29/49158* (2015.01); *Y10T 428/233* (2015.01)

(58) Field of Classification Search
CPC .... B60H 1/00564; B60H 1/242; B60K 35/00; B60K 35/22
See application file for complete search history.

(56) References Cited

U.S. PATENT DOCUMENTS 3,985,158 A  10/1976  Felter
4,735,235 A  4/1988  Anderson
(Continued)

*Primary Examiner* — Allen R. B. Schult
(74) *Attorney, Agent, or Firm* — Egbert, McDaniel & Swartz, PLLC

(57) ABSTRACT

A plug apparatus for sealing an interior of a duct for use in a process for forming an insulated register box has a frame, a shaft extending outwardly of the of the frame, and a plurality of layers of flexible material radiating outwardly of the shaft adjacent to an end of the shaft opposite the frame. The plurality of layers of flexible material are adapted to have an outer periphery bearing against an interior surface of the duct. Each layer of flexible material has an outer diameter greater than an inner diameter of the duct. The flexible material is formed of a neoprene material. The frame is affixed to a support surface having an opening therein. The opening is adapted to receive an outer diameter of the duct therein.

14 Claims, 10 Drawing Sheets

Related U.S. Application Data

11,402,121, and a continuation-in-part of application No. 15/864,612, filed on Jan. 8, 2018, now Pat. No. 10,995,969, said application No. 16/005,235 is a continuation-in-part of application No. 15/703,436, filed on Sep. 13, 2017, now Pat. No. 10,648,695, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969, said application No. 15/864,612 is a division of application No. 14/668,079, filed on Mar. 25, 2015, now Pat. No. 9,951,969.

(56) References Cited

U.S. PATENT DOCUMENTS

| | | | |
|---|---|---|---|
| 5,095,942 A | | 3/1992 | Murphy |
| 5,219,403 A | | 6/1993 | Murphy |
| 5,287,892 A | * | 2/1994 | Sanderson ............. F16L 55/11 |
| | | | 138/92 |
| 5,658,196 A | | 8/1997 | Swaim |
| 5,749,190 A | | 5/1998 | Williams |
| 5,957,506 A | | 9/1999 | Stepp |
| 6,994,326 B1 | * | 2/2006 | Tyson ................... E04H 17/143 |
| | | | 256/22 |
| 2004/0130154 A1 | | 7/2004 | Stepp |
| 2008/0014860 A1 | | 1/2008 | Heitman |
| 2008/0045137 A1 | | 2/2008 | Rosal |

\* cited by examiner

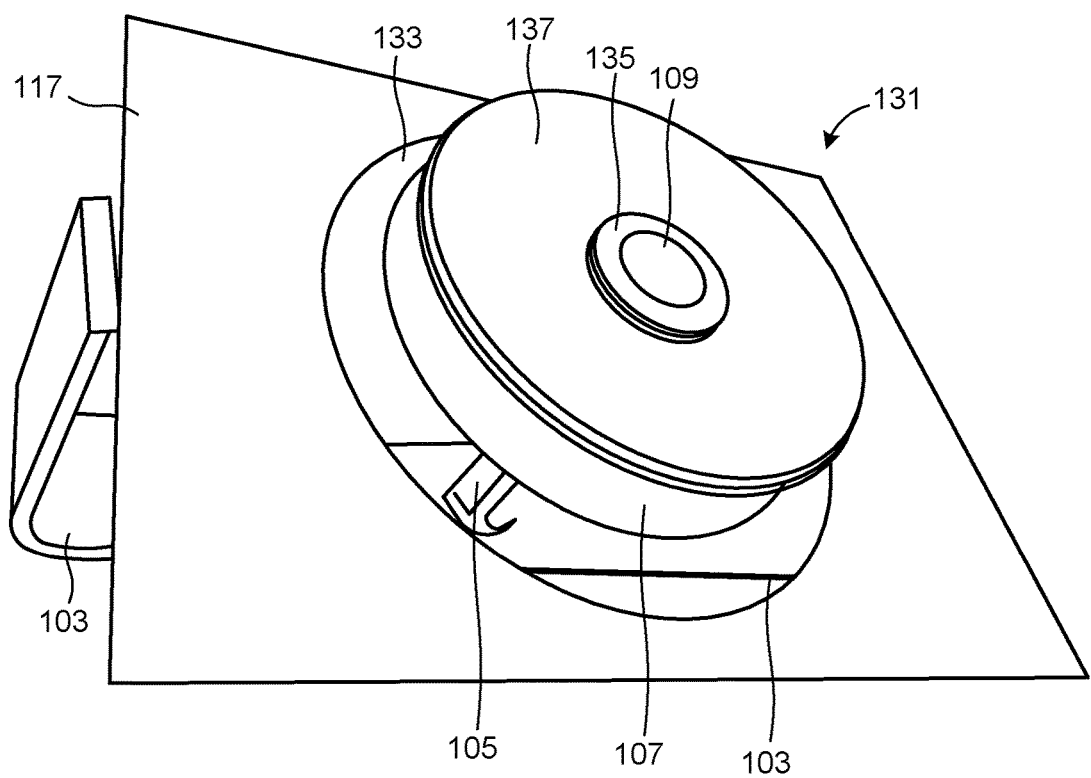
FIG. 7
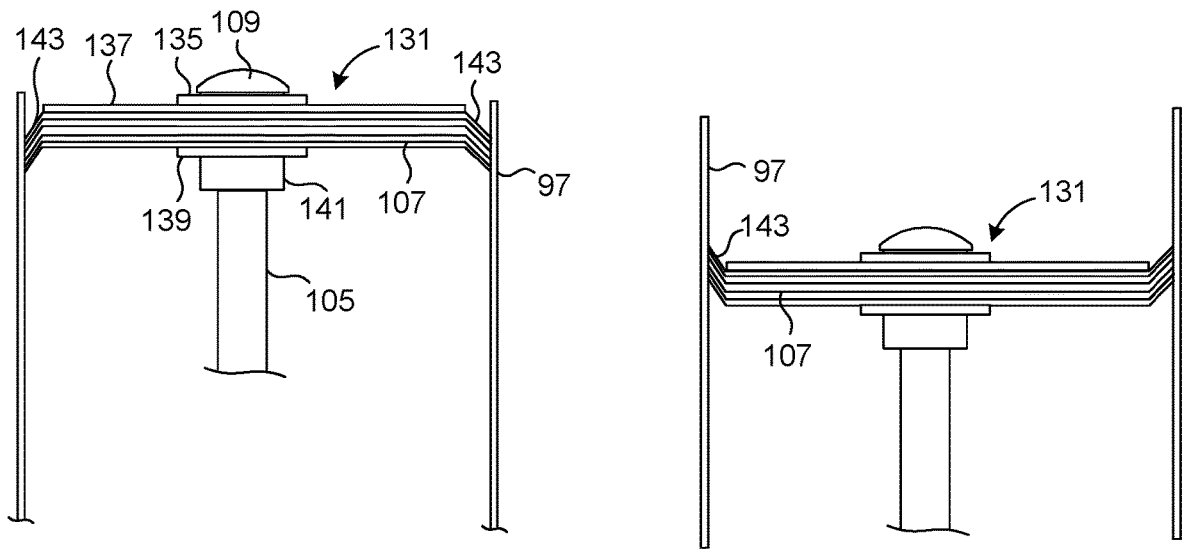
FIG. 8
FIG. 9

FIXED PLUG FOR USE IN A PROCESS OF FORMING AN INSULATED REGISTER BOX

CROSS-REFERENCE TO RELATED APPLICATIONS

The present application is a continuation-in-part of U.S. patent application Ser. No. 17/175,956, filed on Feb. 15, 2021 and entitled "Plug with Rotating Flap for Use in a Process for Forming an Insulated Register Box", presently pending. U.S. patent application Ser. No. 17/175,956, is a continuation-in-part of U.S. patent application Ser. No. 17/171,638, filed on Feb. 9, 2021 and entitled "Conveyor Process for Forming an Insulated Register Box", presently pending. U.S. patent application Ser. No. 17/171,638 is a continuation-in-part of U.S. patent application Ser. No. 16/036,059, filed on Jul. 16, 2018 and entitled "Insulated Register Box and Process For Forming Such Insulated Register Box", presently pending. U.S. patent application Ser. No. 16/036,059 was a continuation-in-part of U.S. patent application Ser. No. 15/864,612, filed in Jan. 8, 2018, which is a divisional of U.S. patent application Ser. No. 14/668,079, filed Mar. 25, 2015 and entitled "Insulated Register Box", now U.S. Pat. No. 9,951,969. U.S. patent application Ser. No. 16/036,059 was also a continuation-in-part of U.S. patent application Ser. No. 16/005,235, filed on Jun. 11, 2018 and entitled "Insulated Register Box with the Boot Rail Adapter", presently pending. U.S. patent application Ser. No. 16/005,235 is a continuation-in-part of U.S. patent application Ser. No. 15/703,436, filed on Sep. 13, 2017, which issued as U.S. Pat. No. 10,648,695 on May 12, 2020 and entitled "Insulated Register Box with Boot Rail Adapter". U.S. patent application Ser. No. 15/703,436 is a continuation-in-part of U.S. patent application Ser. No. 15/439,454, filed Feb. 22, 2017 and entitled "Process for Forming an Insulated Register Box", which issued as U.S. Pat. No. 10,309,682 on Jun. 4, 2019 and entitled "Process For Forming an Insulated Register Box". U.S. patent application Ser. No. 15/439,454 was a continuation-in-part of U.S. patent application Ser. No. 14/668,079, filed on Mar. 25, 2015 and entitled "Insulated Register Box and Method for Forming an Insulated Register Box", which issued as U.S. Pat. No. 9,951,969 on Apr. 24, 2018.

BACKGROUND OF THE INVENTION

1. Field of the Invention

The present invention relates to ductwork for heating, ventilation and air-conditioning (HVAC) systems. More particularly, the present invention relates to processes for forming register boxes as used in such systems. In particular, the present invention relates to plugs as used in the process for forming such register boxes.

2. Description of Related Art Including Information Disclosed Under 37 CFR 1.97 and 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The present Applicant is the owner of several patents and patent application publications related to such register boxes and the processes for forming such register boxes. For example, U.S. Patent Application No. 2018/0363942, published on Dec. 20, 2018 to the present Applicant, describes an insulated register box and process for forming the insulated register box. This register box has a body with a plurality of side walls arranged in a generally rectangular or square configuration and a plurality of flanges extending inwardly from the plurality of side walls. An expandable polymeric material is affixed to an inner side of each of the plurality of side wall such that the expandable polymeric material has a portion extending across one end of the body inwardly of the plurality of flanges. A sheet is positioned over the portion of the expandable polymeric material at one end of the body such that the sheet is interposed between the plurality of flanges and the portion of the expandable polymeric material. The expandable polymeric material and the sheet are cuttable so as to open to the interior of the register box.

U.S. Pat. No. 10,648,695, issued on May 12, 2020 to the present Applicant, describes a register box with a boot rail adapter that has an insulating material affixed within the register box, a guide rail affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

U.S. Pat. No. 10,309,682, issued on Jun. 4, 2019 to the present Applicant, teaches a process for insulating a register box in which the register box has a plurality of side panels arranged in a generally rectangular configuration and a duct opening through a wall that extends across the generally rectangular configuration. This process involves flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner then removed from the register box.

U.S. Patent Application Publication No. 2018/0320921, published on Nov. 8, 2018 to the present Applicant, teaches an insulated register box apparatus with a boot rail adapter which has an insulating material affixed within the register box, a rail affixed to a side panel of the register box, and a rail guide having a slot that receives a section of the rail therein. The rail guide is adapted to be affixed to a supporting surface. The rail is affixed at least one of the side panels of the register box. The rail is slidable relative to the rail guide. The register box has a plurality of side panels and a duct that opens to an interior of the plurality of side panels. The insulating material extends inwardly of the plurality of side panels.

U.S. Patent Application Publication No. 2018/0187919, published on Jul. 5, 2018 to the present Applicant, teaches an insulated register box for HVAC installations that has a body with a plurality of side panels arranged in a generally rectangular or square configuration and a wall extending across the rectangular configuration. A duct opens through the wall so as to communicate with an interior of the body. An expandable foamed polymeric material is affixed to an inner side of the side panels. The wall has a surface extending from the opening of the duct to the side panels. The expandable foamed polymeric material is affixed to the surface of the wall.

U.S. Pat. No. 9,951,969, issued on Apr. 24, 2018 to the present Applicant, describes an insulated register box and a method for forming such an insulated register box. The register box has a body with a plurality of side panels arranged in a generally rectangular or square configuration and a wall extending across the rectangular configuration. A duct opens through the wall so as to communicate with the interior of the body. An expandable foamed polymeric material is affixed to an inner side of the side panels. The wall has a surface extending from the opening of the duct to the side panels. The expandable foamed polymeric material is affixed to the surface of the wall.

With these prior patents and patent application publications, the process for forming the register box involved the use of a carousel-type of operation. In essence, the worker would place the assembly into a "Lazy Susan" type of carousel and rotate the carousel as the expandable polymeric material would dry or cure during the rotation of the carousel. This operation was excellent in practice. A problem with this process was that occasionally the expandable polymeric material would leak into the interior of the duct of the register box. When the expandable polymeric material enters the duct, it would require cleaning and scraping subsequent to the formation of the register box. If the solidified expandable polymeric material remained within the duct, it could interfere with the air delivery characteristics of the duct. Furthermore, this expandable polymeric foam material would leave an unsightly appearance to those purchasing and installing the insulated register box. The appearance of expandable polymeric material in the interior of the duct ultimately requires extra time, labor and expense during the manufacturing process. As such, a need has developed so as to prevent the expandable polymeric foam material from entering the duct of the register box.

It is an object of the present invention to provide a fixed plug for use in a process for forming an insulated register box that effectively prevents expandable polymeric material from entering the interior of the duct.

It is another object of the present invention to provide a fixed plug for a process for forming an insulated register box which can be easily installed in the interior of the duct during the production process.

It is another object of the present invention to provide a fixed plug for use in a process for forming an insulated register box which can be easily adapted to various sizes and shapes of ducts.

It is another object of the present invention to provide a fixed plug for use in a process for forming an insulated register box which avoids any need for scraping and cleaning of the duct following production.

It is still another object of the present invention to provide a fixed plug for use in a process for forming an insulated register box which reduces labor requirements, reduces time requirements and reduces expenses.

It is still a further object of the present invention to provide a fixed plug for use in a process for forming an insulated register box which effectively acts to remove any residual expandable polymeric material from the interior of the duct.

These and other objects and advantages of the present invention will become apparent from a reading of the attached specification and appended claims.

BRIEF SUMMARY OF THE INVENTION

The present invention is a plug apparatus for sealing an interior of a duct for use in a process for forming an insulated register box. This plug apparatus comprises a frame, a shaft extending outwardly of the frame, and a plurality of layers of flexible material radiating outwardly of the shaft adjacent to an end of the shaft opposite the frame. The plurality of layers of flexible material are adapted to have an outer periphery bearing against an interior surface of the duct.

The shaft is connected to the frame such that the layers of flexible material are located away from the frame. The shaft has a cap at an end opposite the frame. A washer is interposed between the cap and the layers of flexible material. The washer is of a rigid material. The washer will have a diameter less than an outer diameter of the plurality of layers of flexible material. A fastener is affixed to the shaft on a side of the plurality of layers of flexible material opposite the washer. The fastener has a surface bearing against the layers of flexible material. The fastener has a diameter less than the outer diameter of the layers of flexible material. Each layer of the layers of flexible material has an outer diameter greater than an inner diameter of the duct. Each of the layers of flexible material is of a neoprene material.

The present invention is also an assembly for use in forming an insulated register box in which the insulated register box has a box with a duct having a portion extending into an interior of the box and another portion extending outwardly of an interior of the box. The assembly comprises a support surface having at least one opening formed therethrough, a frame affixed to the support surface, a shaft affixed to a portion of the frame and extending toward the opening of the support surface, and a plurality of layers of flexible material radiating outwardly of the shaft adjacent to an end of the shaft opposite the frame. The opening of the support surface is adapted to receive the duct of the register box therein. The plurality of layers of flexible material are adapted to have an outer periphery bearing against an inner wall of the duct. In an embodiment of the present invention, the frame is affixed to a table. The table is rotatable.

The frame has a generally square U-shaped configuration. One leg of the frame is affixed to an underside of the support surface adjacent one side of the opening. Another leg of the frame is affixed to the underside of support surface adjacent an opposite side of the opening. A portion of the frame extends between the legs and is in generally parallel planar relationship to the underside of the support surface. The shaft projects toward a center of the opening. The shaft has a cap at an end opposite the frame. A washer is positioned on the shaft and is interposed between the cap and the layers of flexible material. The washer has a diameter less than an outer diameter of the layers of flexible material. A fastener is affixed to the shaft on the side of the plurality of layers of flexible material opposite the washer. The fastener has a surface bearing against the layers of flexible material. The fastener has a diameter less than the outer diameter of the layers of flexible material. Each layer of the plurality of the flexible material has an outer diameter greater than an inner diameter of the duct. In the preferred embodiment of the present invention, the flexible material is a neoprene material.

The present invention is also a process for forming an insulated register box. This process includes the steps of: (1) forming a frame having a shaft extending outwardly therefrom in which the shaft has a plurality of layers of flexible material radiating outwardly therefrom; (2) injecting an expandable polymeric material into the interior of the box such that the expandable polymeric material is directed to an inner wall of the box; (3) sliding the duct over the shaft and over the layers of flexible material such that the layers of flexible material bear against an inner wall of the duct; (4) placing a form into the interior of the box so as to bear against one end of the duct in the interior of the box; (5) covering the end of the box opposite the duct and the form so as to retain the expandable polymeric material within the box as the expandable polymeric material expands; (6) removing the form from the interior of the box after the expandable polymeric material has expanded; and (7) lifting the box and the duct from the shaft and the plurality of layers of flexible material. A plastic sheet is placed between the expandable polymeric material and the form.

This foregoing Section is intended to describe, with particularity, the preferred embodiments of the present invention. It is understood that modifications to this preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 7 is a upper perspective view showing the plug as used in the process for forming the insulated register box of the present invention.

FIG. 8 is a cross-sectional side view showing the plug of the present invention as installed within the duct of the insulated register box.

FIG. 9 is a cross-sectional view showing the plug as installed within the duct of the insulated register box and showing the plug being removed from the duct of the insulated register box of the present invention.

DETAILED DESCRIPTION OF THE INVENTION

Figure 1:
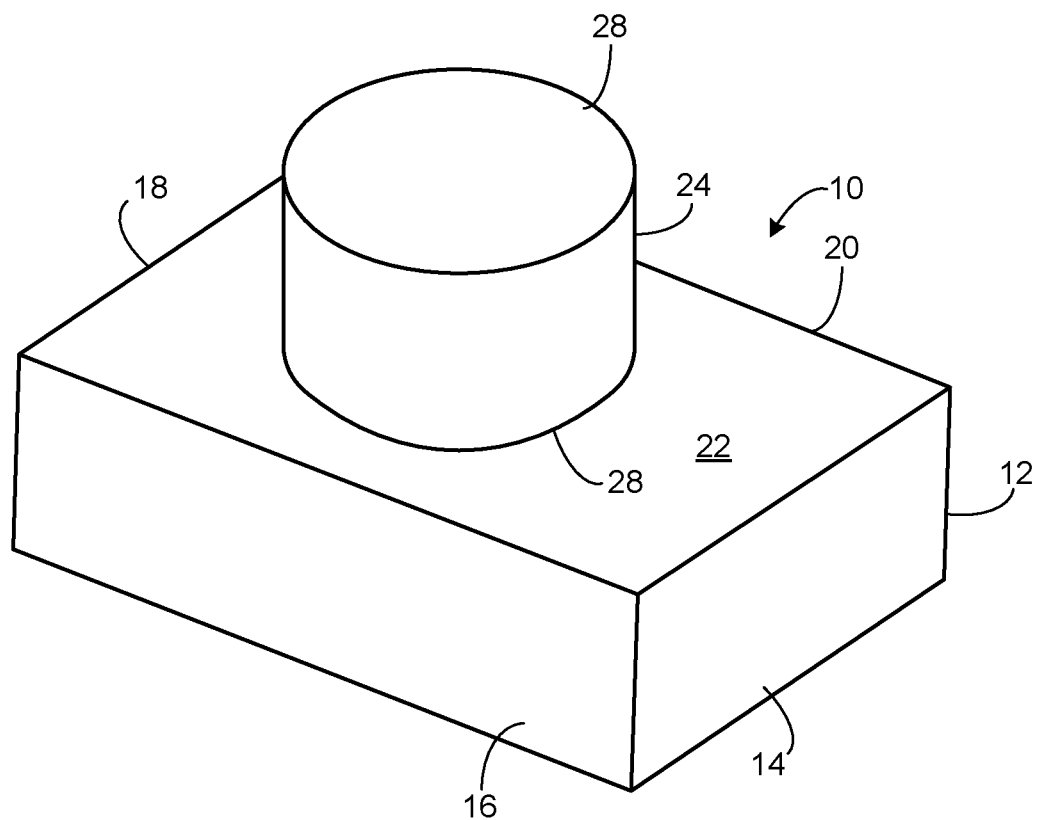
FIG. 1 is an upper perspective view showing an insulated register box formed by the process of the present invention.

Referring to FIG. 1, there shown the insulated register box 10 as formed with the plug of the present invention. The register box 10 includes a box 12 having side walls 14, 16, 18 and 20 that are formed into a generally rectangular configuration. A back wall 22 extends across this generally rectangular configuration. A duct 24 is illustrated as affixed to the back wall 22 and extends so as to open to the interior of the box 12. The duct 24 includes an open end 26 that allows the duct 24 to be connected to the HVAC system of a building. Conventionally, the register box 10 will be formed and pieced together through the use of tack welding. In particular, the duct 24 can be tack welded to the box 22. The duct 24 will have a portion that extends into the interior of the box 12.

Figure 2:
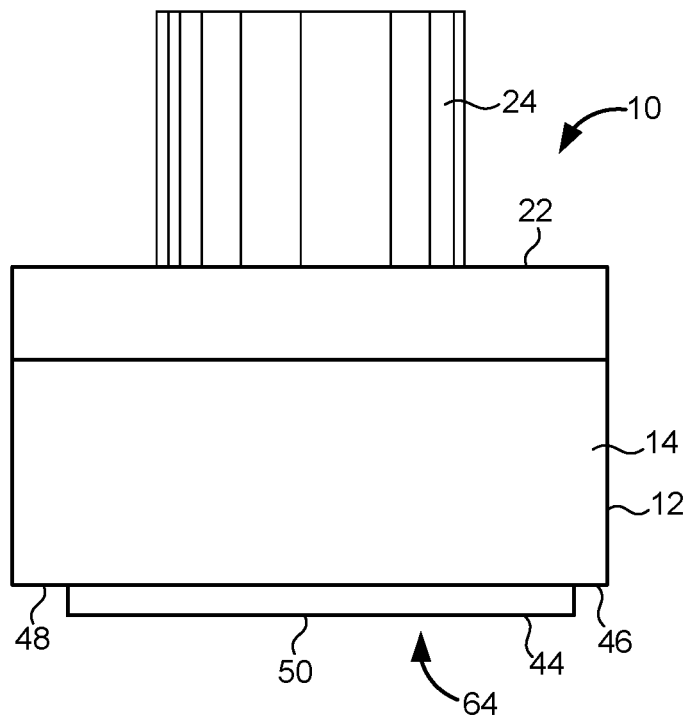
FIG. 2 is a side elevational view showing the insulated register box formed by the process of the present invention.

FIG. 2 shows a side view of the register box 10. As can be seen in FIG. 2, the side wall 14 is particularly illustrated. The duct 24 is illustrated extending outwardly of the back wall 22. It can be seen that there is a lip 44 that extends outwardly of the end 46 of the box 12. The lip 44, as will be described hereinafter, extends outwardly of a flange 48. Flange 48 extends inwardly from the side walls 14, 16, 18 and 20 such that the lip 50 defines an opening 64 which opens to the interior of the box 12.

Figure 3:
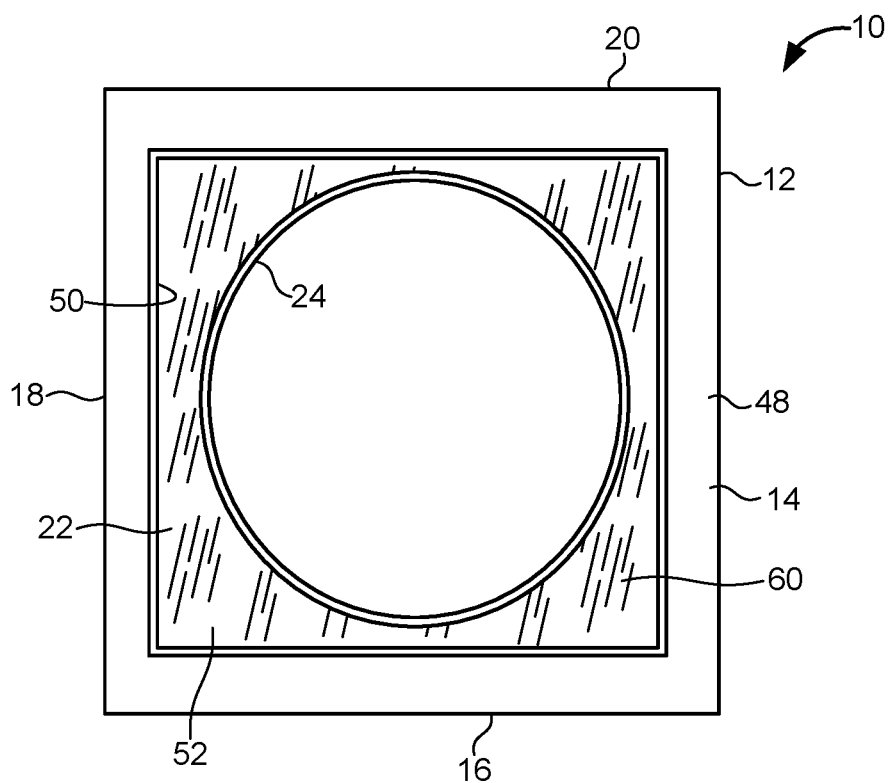
FIG. 3 is an end view showing the insulated register box form by the process of the present invention.

FIG. 3 is an end view of the register box of the present invention. In FIG. 3, it can be seen that the duct 24 is affixed to the back wall 22. Back wall 22 includes a surface 52 that extends from the opening of the duct 24 to the side walls 14, 16, 18 and 20 of the box 12. The expandable polymeric material 60 resides over the surface 52 and extends to the side walls 14, 16, 18 and 20. As such, the expandable polymeric material 60 effectively insulates the back wall 22 in the area adjacent to the opening of the duct 24.

FIG. 3 further shows the nature of the flanges 48. Flanges 48 have a particular width. In accordance with the present invention, the expandable polymeric material 60 will reside against the side walls 14, 16, 18 and 20 and have a thickness approximately equal to the width of the flanges 48. The lip 50 is illustrated as extending in transverse relationship from the flange 48.

Figure 4:
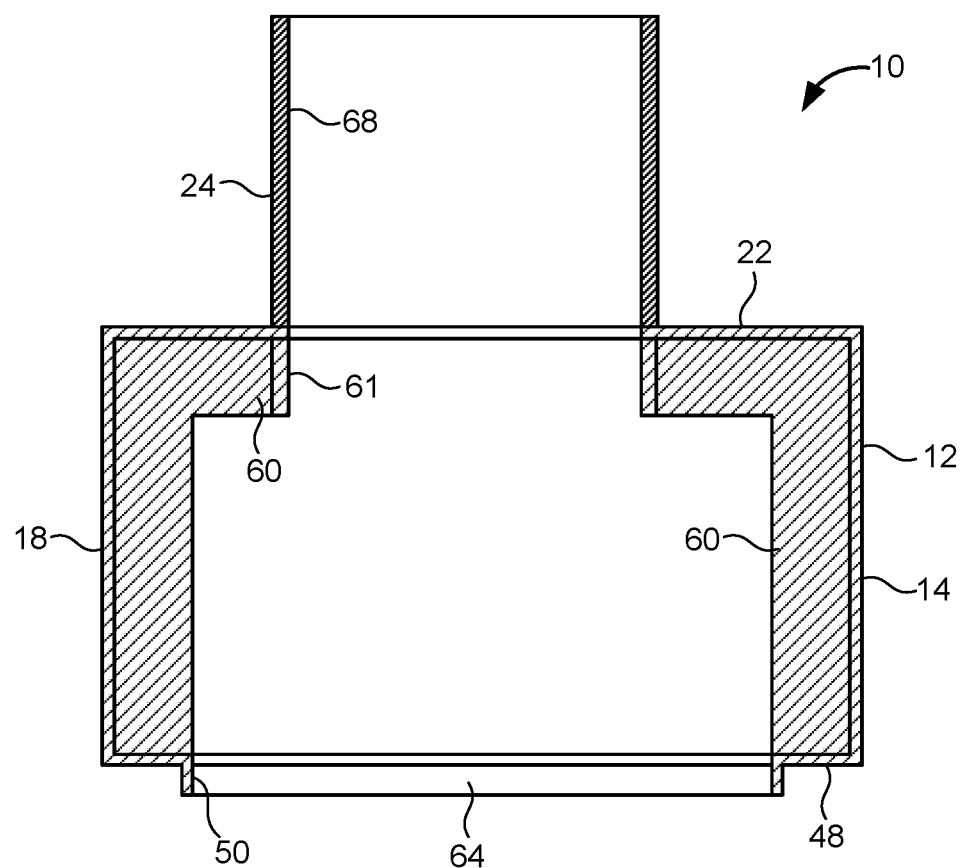
FIG. 4 is a cross-sectional view showing the register box is formed by the process of the present invention.

FIG. 4 is a cross-sectional view of the register box 10 of the present invention. As can be seen in FIG. 4, the expandable polymeric material 60 is illustrated as positioned against the side walls 14 and 16. A similar configuration will occur with respect to the side walls 16 and 20. The expandable polymeric material 60 is illustrated as having a thickness approximately equal to the width dimension of the flange 48. The flange 48, along with the lip 50, defines an opening 64 that opens to the interior of the box 12. The expandable polymeric material 60 also has a portion that resides against the inner surface of the back wall 22. This portion 60 extends from the side walls 14 and 18 so as to bear against the portion 61 of the duct 24 that extends into the interior of the box 14.

In this configuration, the expandable polymeric material 60 can serve as insulation. This insulation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expandable polymeric material 60 does not require any alterations in the structure of the box 12 or of the duct 24. The insulation material causes the register box 10 to be very energy-efficient.

In FIG. 4, it can be seen that there is no expandable polymeric material located on the inner wall 68 of the duct 24. If any expandable polymeric material would enter the duct 24 or reside on the inner wall 68 of the duct 24, it could hamper air circulation. Any expandable polymeric material that enters the duct 24 would detract from the appearance of the insulated register box 10. Furthermore, any expandable polymeric material that should leak into the interior of the duct 24 will create uncertainties as to the amount of material that should be introduced into the interior of the register box. If an excessive amount of expandable polymeric foam material leaks into the interior of the duct, less material will reside on the interior of the insulated register box. This can hamper the insulating qualities of the register box. Additionally, if any expandable polymeric material should leak into the interior of the duct, additional personnel or man hours are required to clean and scrape this material from the interior of the duct. This increases time and labor required for the production of the insulated register box. It has also been found that it is possible that, during the removal of such material, the insulation on the interior of the register box could tear. Ideally, the prevention of expandable polymeric foam material from entering the interior of the duct can result in uniform amounts of expandable polymeric material being introduced. As such, it is important to block the expandable polymeric material from entering the area of the interior of the duct 24. Since the expandable polymeric material 60 extends to the opening 64 that is defined by the lips 50 and the flanges 48, it does not interfere with air flow into the interior of the register box. The movement of the expandable polymeric material toward the interior of the duct 24 is blocked by portion 61 of the duct 24. The blocking of the expansion of the expandable polymeric material into the interior of the duct will be further blocked by the plug as used in the process of the present invention, to be described hereinafter. As such, the blocking of this expandable polymeric foam material from entering the interior of duct allows the interior of the duct to be more aerodynamic, reduces labor and material cost, improves uniformity, improves the aesthetic appearance of the register box, and reduces costs.

Figure 5:
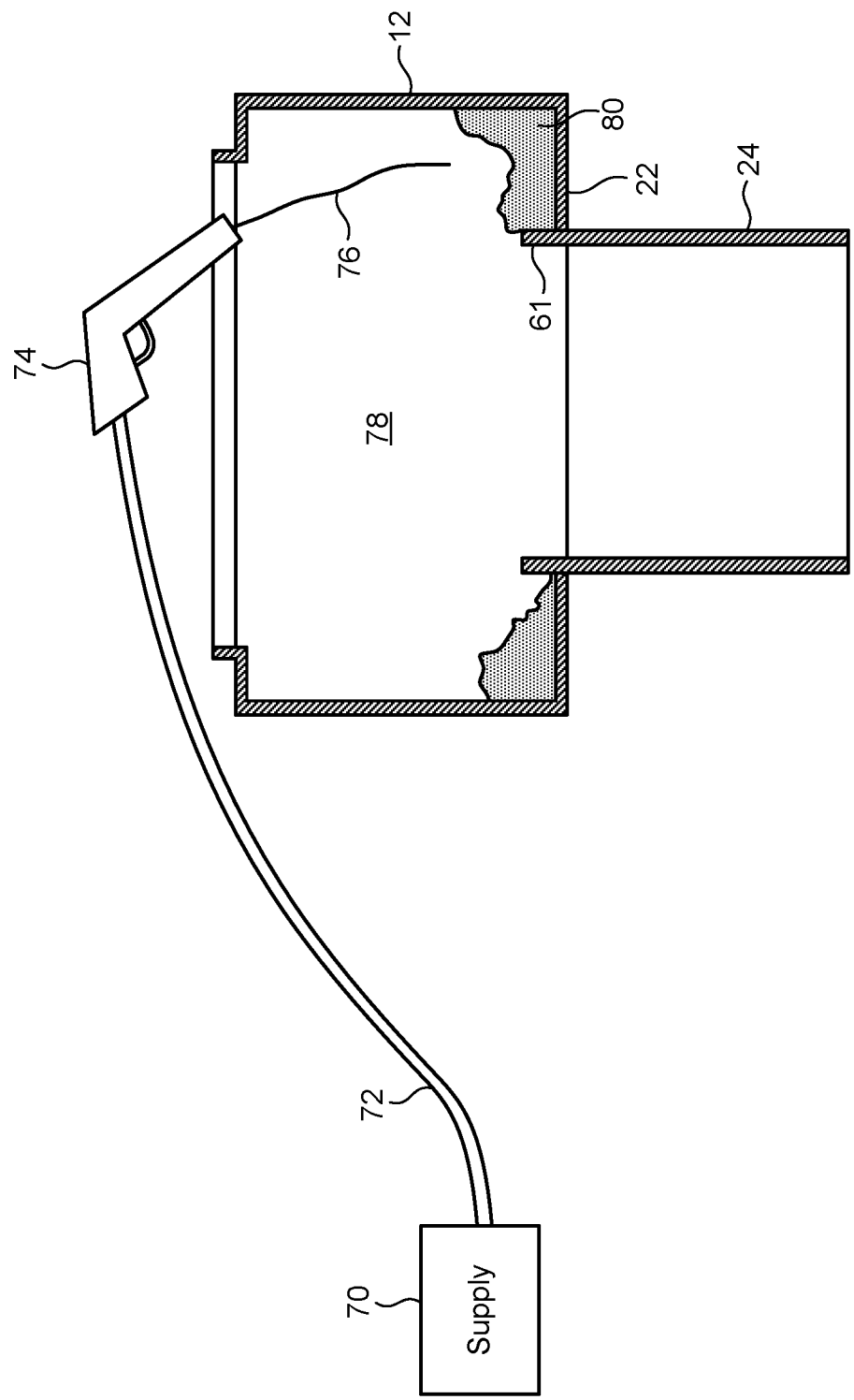
FIG. 5 shows an initial step in the process for forming the insulated register box in accordance with the present invention.

FIG. 5 shows an initial step in the process of the present invention. In FIG. 5, it can be seen that there is a supply of expandable polymeric material 70 that is connected by a conduit 72 to a foam gun 74. A pump can be used in association with the conduit 72 and/or the supply 70 in order to allow the gun 74 to spray the expandable polymeric material 76 into the box 12 of the register box. In particular, it can be seen that the expandable polymeric material 76 is generally introduced into a corner 80 between the side walls 14, 16, 18 and 20 and the back wall 22. The portion 61 of the duct 24 that extends into the interior 78 of the box 12 resists the flow of expandable polymeric material into the interior of the duct 24. The small amount of expandable polymeric material that is placed into the interior 78 of the box 12 will suitably expand so as to cover the necessary area in order to create the insulation shown in FIG. 4.

Figure 6:
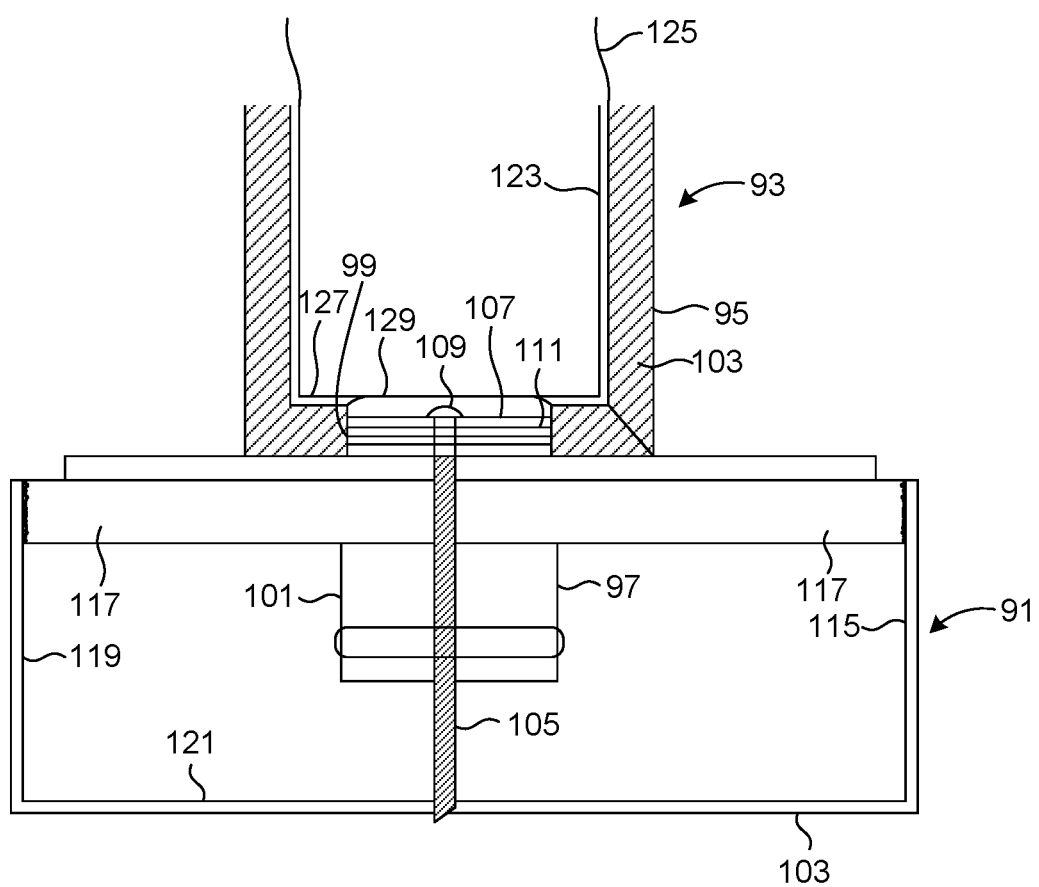
FIG. 6 is a cross-sectional view showing the plug assembly as used in the process for forming the insulated register box of the present invention.

FIG. 6 shows the plug assembly 91 as used in the process for forming the register box 93. The insulated register box 93 includes a box 95 having a duct 97 affixed thereto. Duct 97 has a first portion 99 that extends into the interior of the register box. Duct 97 has a second portion 101 that extends outwardly of the exterior of the register box. The expandable polymeric material 103 is illustrated as expanded within the interior of the box 95. The plug apparatus 91 is illustrated as installed within the interior of the duct 97. The plug apparatus 97 includes a frame 103 having a shaft 105 extending outwardly of the frame 103. A plurality of layers of flexible material 107 radiate outwardly of the shaft 105 adjacent to an end 109 of the shaft 105. The plurality of layers of flexible material 107 have an outer periphery bearing against an inner wall 111 of the duct 97. The shaft 105 is connected to the frame 103 so as to fix a distance of the layers of flexible material 107 away from the frame 103. The frame 103 has a generally square U-shaped configuration. One leg 115 of frame 103 is affixed to a support surface 117. Another leg 119 of frame 103 is welded or otherwise affixed to the support surface 117. The frame 103 has a portion 121 extending between legs 115 and 119. Shaft 105 is positioned generally centrally on the portion 121 so as to extend upwardly in order to be centralized within the interior of the duct 97. As will be described hereinafter, each layer of the plurality of layers of flexible material 170 will have an outer diameter greater than an inner diameter of the duct 97. Each of the layers of flexible material of formed of a neoprene material.

In FIG. 6, it can be seen that there is a form 123 that is introduced into the interior of the box 95. A sheet of plastic material 125 is interposed between the form 123 and the expandable polymeric material 103. The form 123 will restrain the expandable polymeric material to its desired configuration. The form 123 has a bottom surface 127 that bears against the end 129 of the duct 97. This arrangement serves to prevent some intrusion of the expandable polymeric material from the interior of the duct 97. The layers of flexible material 107, located within the interior of the duct 97, further serve to prevent any intrusion of this expandable polymeric material. As will be described hereinafter, if any expandable polymeric material should leak through any space between the layers of expandable polymeric material and the inner surface of the duct 97, then the material is removed when the insulated register box 93 is lifted from its position on the plug assembly 91.

FIG. 7 shows the plug apparatus 131 of the present invention. The plug apparatus has frame 103 secured to support surface 117. An opening 133 is formed in the support surface 117. Shaft 105 is affixed to the frame 103 and extends upwardly therefrom. The plurality of layers of flexible material 107 are illustrated as positioned on the shaft 105 adjacent to an end of the shaft 105 opposite the frame 103. The opening in the support surface 117 will have a diameter slightly greater than the outer diameter of the duct 97. This will allow the duct 97 to easily slide into the opening 133. The duct 97 will slide over the outer periphery of the layers of flexible material 107. The outer periphery of the layers of flexible material 107 will bear against the inner wall of the duct.

In FIG. 7, it can be seen that the shaft 105 has a cap 109 at the upper end thereof. A first washer 135 will bear against the inside surface of the cap 109. A second washer 137 will bear against the underside of the first washer 135. The second washer 137 has an outer diameter substantially greater than the outer diameter of the first washer 135. The second washer 137 will have an outer diameter slightly less than the outer diameter of the layers of flexible material 107. There will be only small portions (of approximately ⅛ to ¼ inch) protruding outwardly of the outer diameter of the second washer 137. The rigid second washer 137, serves to resist excessive deflection of the layers of flexible material 107 during removal of the insulated register box 93 during removal from the plug apparatus 131.

FIG. 8 shows the plug apparatus 131 as assembled within the interior of the duct 97. The duct apparatus 131 will be in a fixed position. The duct 97 will slide over the outer periphery of the layers of flexible material 107. As stated hereinbefore, the shaft 105 has a cap 109 at the upper end thereof. A first washer 135 is interposed between the underside of the cap 109 and the second washer 137. The second washer 137 is very rigid. As such, this rigid surface provided by the washer 137 will prevent the layers of flexible material from deflecting too much during the installation and removal of the duct 97 over the plug apparatus 131. Another washer 139 coupled with a fastener 141 is provided on the underside of the plurality of layers of flexible material 107. The washers 137 and 139 provide a tightly sandwiched configuration for the plurality of layers of flexible material 107. Fastener 191 has a diameter less than the diameter of the first washer 135. As such, the layers of flexible material 107 will deflect more during installation than during removal. This facilitates easy installation. During removal, the extra rigidity provided by the first washer 135 enhances the ability to wipe or scrape the interior of the duct 97.

FIG. 8 shows a unique feature of the present invention. The outer periphery 143 of the layers of flexible material 107 is deflected downwardly during the installation of the duct 97. This outer periphery 143 will still bear tightly against the inner wall of the duct 97. This deflection allows the duct 97 to be easily placed over the outer periphery 143 of the layers of flexible material 107. The tight engagement between the outer periphery 143 in the inner wall of the duct 97 will prevent the intrusion of expandable polymeric material into the interior of the duct 97.

As shown in FIG. 9, after the insulated register box 93 has been formed, the duct 97 can be lifted from the plug apparatus 131. During this lifting, the outer periphery 143 of the plurality of layers of flexible material 107 will deflect upwardly. This upward deflection allows for the removal of the duct 97 from the plug apparatus 131. Also, this upward deflection can cause a wiping of the inner wall of duct 97 as it is being removed from the duct apparatus 131. This further removes any traces of the expandable polymeric material from the inner wall of the duct 97.

Figure 10:
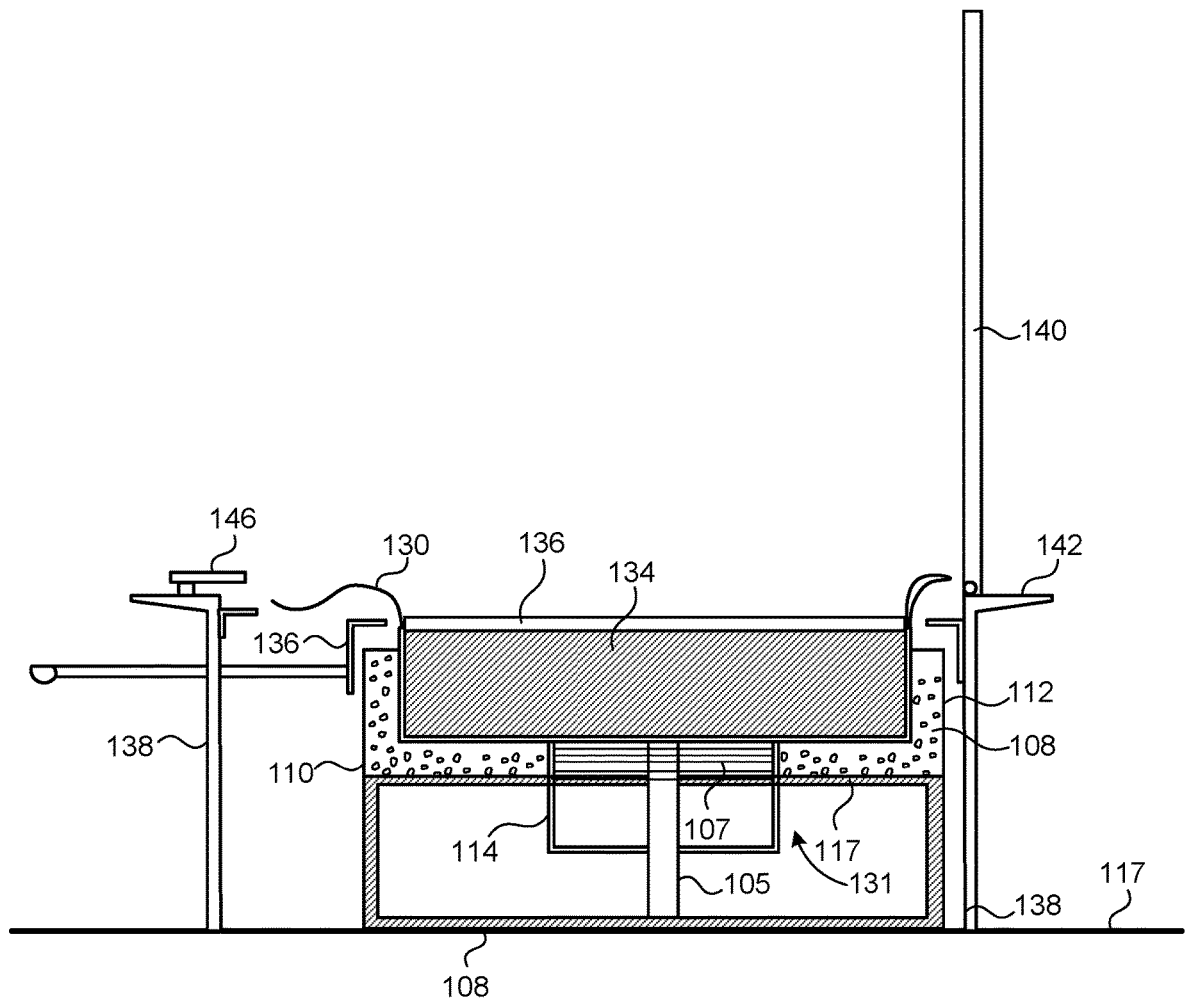
FIG. 10 is a cross-sectional view of a step in the process of forming the insulated register box of the present invention.

FIG. 10 illustrates shows the process for forming a register box using the plug apparatus of the present invention. Initially, it can be seen that the register box 112 has a duct 114 extending downwardly therefrom. Register box 112 has box 110 connected to the duct 114. The frame 103 is formed and affixed to support surface 117. The shaft 105 is affixed to the frame 103 and extends upwardly therefrom. The shaft 105 has a plurality of layers of flexible material 107 at an end opposite the frame 103.

Initially, the expandable polymeric material 108 is injected into the interior of the box 110 such that the expandable polymeric material is directed to an inner wall of the box 110. This step was described herein previously in association with FIG. 5. The duct 114 then slides over the shaft 105 and over the plurality of layers of flexible material 107 such that the plurality of layers of flexible material bear against an inner wall of the duct 114. A form 134 is placed into the interior of the box 110 so as to bear against an end of the duct 114 located in the interior of the box 110. A plastic material 130 will be interposed between the outer surfaces of the form 134 and the expandable polymeric material 108. This allows for the easy separation of the form 134 from the expandable polymeric material 108 at the end of the process. A plate 136 is placed over the top of the block 134. Alternatively, the plate 136 can be a portion of the box 134.

A framework is provided for supporting the components of the present invention. This framework includes legs 138 that extend upwardly from the support surface 117. Hold downs 136 are provided on opposite sides of the box 110. A cover 140 is pivotally mounted to the fixture 142. The cover 140 allows for the installation of the box 110 and duct 114 onto the plug apparatus 131. Lock 146 is provided on at an opposite side of the fixture 142 so as to allow the cover 140 to be secured in position during the formation of the insulated register box.

Figure 11:
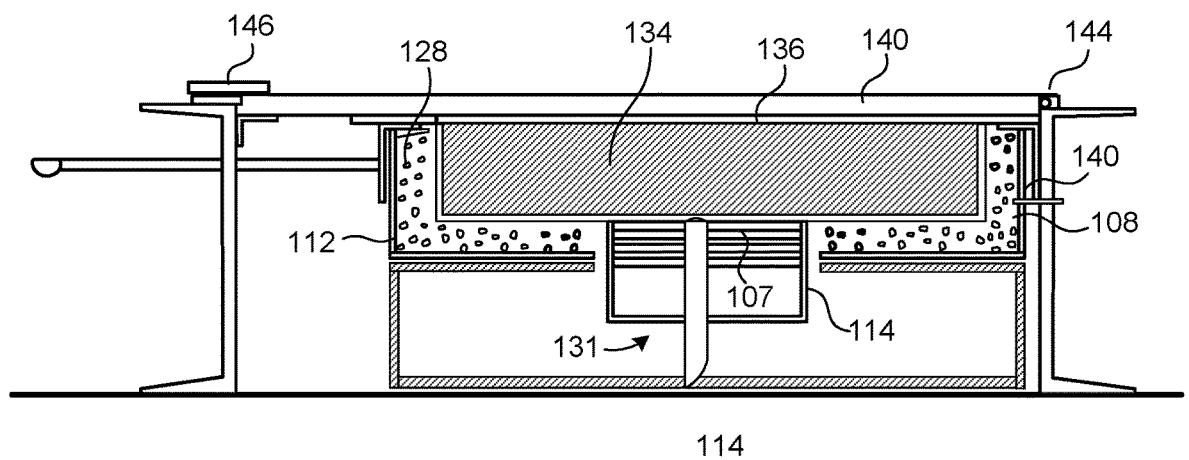
FIG. 11 is a cross-sectional view of a further step in the formation of the insulated register box of the present invention.

FIG. 11 shows a further step in the process of forming the insulated register box 112 of the present invention. As can be seen, the cover 140 has been pivoted about pivot point 144 and locked into position by lock 146. This exerts a pressure upon the plate 136 or upon the top of the form 134. This causes the bottom of the form 134 to bear against the end of the duct 114. This will also cause the bottom of the form 134 to bear against the layers of flexible material 107. The hold downs 136 restrict the outward movement of the expandable polymeric material 108.

In this configuration, the expandable polymeric material 108 will continue to cure, expand and dry. The register box insulated register box will remain in this configuration for the remainder of the process. Ultimately, after the expandable polymeric material 108 has expanded fully, the cover 140 can be unlocked from lock 146 and lifted. A worker can then manually lift the register box and the duct 114 from the plug apparatus 131. The layers of flexible material 107 will wipe or scrape the inner surfaces of the duct 114 so as to assure that no expandable polymeric material remains on the inner walls of the duct 114.

It can be seen that the plug apparatus 113 establishes a tight seal on the interior of the duct 114. This is very important so as to prevent the expandable polymeric material 108 from entering the interior of the duct 114. Additionally, the strong forces caused by the form 134 against the end of the duct 114 further serves to avoid any leakage of expandable polymeric material into the interior of the duct 114. Since the intrusion of expandable polymeric material 108 into the interior of the duct 114 is prevented by the present invention, there is no need for subsequent cleaning actions for the removal of the residual foam from the interior of the duct 114. Also, this assures that the uniform introduction of expandable polymeric material into the interior of the box 110 will create uniform results. The appearance of the insulated register box 112 is improved by avoiding the appearance of scraped material in the interior of the duct 114. This also avoids those problems in which the expandable polymeric material 108 is damaged during the interior cleaning of the duct 114. As such, the plug apparatus 131 of the present invention provides cost savings, reduction in material usage, reduced labor cost, and improved anesthetics.

The process of the present invention greatly improves the efficiency of the production of insulated register boxes. In the past, a great deal of manual activity was required so as to install the fibrous insulating material against the various side panels and wall of the register box. In the present invention, since fibrous insulating material is not required, the present invention can rapidly create insulated register boxes.

Figure 12:
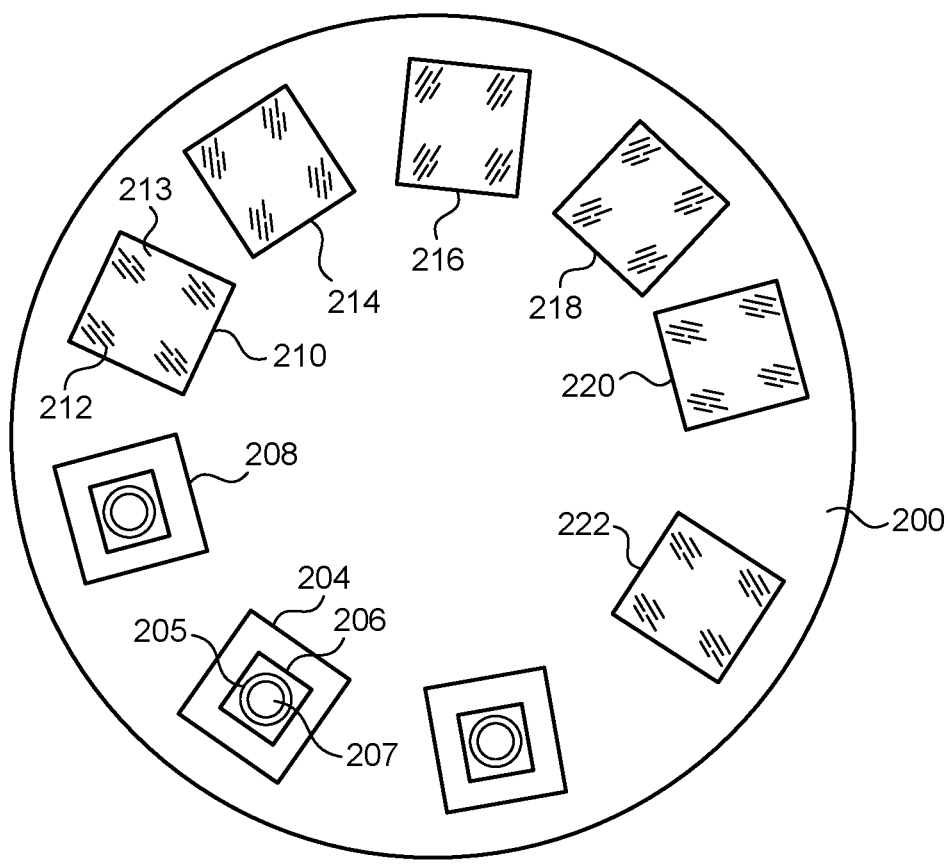
FIG. 12 is a plan view of the support table as used in the process for forming the insulated register box of the present invention.

FIG. 12 shows a carousel 200 that receives the plug apparatus of the present invention. The use of the carousel 200 facilitates the ability for a single worker, or a pair of workers, to rapidly produce the insulated register boxes. As used herein, the carousel 200 is considered to be one type of "table". A wide variety of other "tables", such as single flat tables, rounded platforms, and various other structures can be envisioned within the concept of the present invention.

In FIG. 12, it can be seen that there is a register box 204 that is been inserted into an opening 206 in the support surface of the plug apparatus. In particular, the duct 205 of the register box 204 is placed onto the plug apparatus 207. As such, the interior of the box of the register box will face upwardly from the carousel 200. Another uninsulated register box 208 resides in another opening in the support surface adjacent to the register box 204. Register box 210 is illustrated as in the step of installing the insulating material 212. The insulating material 212 is installed into the interior of the register box 210 in the manner described herein previously. After the insulating material has been installed, a cover 213 is placed over the register box as the carousel 200 moves from an installation position to a discharge position. The carousel 200 can be suitably rotated such that the completed insulated register boxes can be removed and another uninsulated register box installed.

The various register boxes 214, 216, 218, 220 and 222 can proceed to be rotated with the carousel during the production activities. Ultimately, the register box 222 is in the position suitable for removal by a worker located adjacent to the register box 222. The register box 222 can be lifted from the opening 224 and then stacked to the side. Unlike the previous insulated register boxes, the process of the present invention greatly facilitates the ability to stack. Since the expandable polymeric material will solidify in approximately two minutes, the process associated carousel 200 is relatively rapid.

Figure 13:
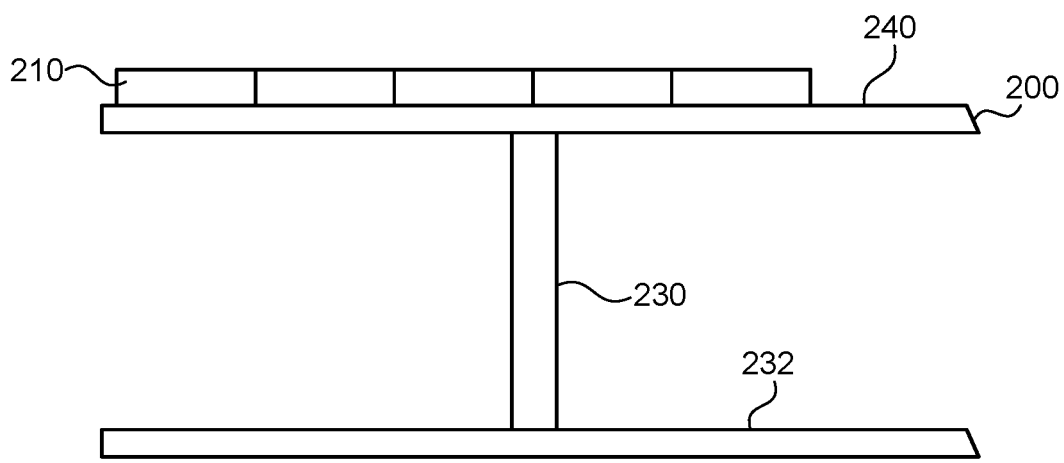
FIG. 13 is a side elevational view of the support table as used in the process for forming the insulated register box of the present invention.

FIG. 13 is a side view showing the arrangement of the carousel and the various register boxes thereon. In particular, in FIG. 13, it can be seen that the carousel 200 is rotatably mounted upon a support 230. The support 230 is maintained in an upright position by a base 232. The register box 210 is maintained in a proper position by inserting the duct into the opening in the support surface of the plug apparatus. The various other register boxes are illustrated as also supported on the top surface 240 of the carousel 200.

Figure 14:
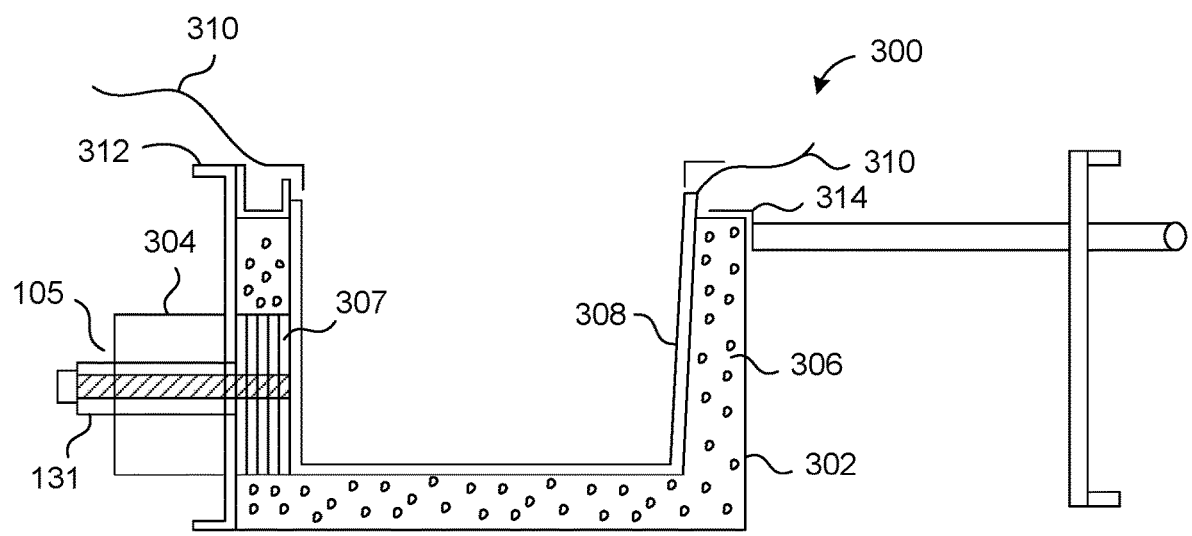
FIG. 14 is a cross-sectional view of an alternative embodiment of the process for forming the insulated register box of the present invention.

FIG. 14 illustrates an alternative embodiment of the plug assembly 300 of the present invention. Plug assembly 300 can be utilized in association with those register boxes 302 that have side ducts 304. FIG. 14 shows the plug apparatus 131 as installed into the side duct 304. Plug apparatus 131 includes the shaft 105 and the plurality of layers of flexible material 107. Shaft 131 can be supported by a frame. As such, the side duct 304 can simply be pushed onto the plug apparatus 131 for proper sealing. The expandable polymeric material 306 is introduced into the wall of the register box 302. A form 308 is positioned in the interior of the register box 302 (as described herein previously). A plastic isolator 310 will be interposed between the outer surfaces of the form 308 and the expandable polymeric material 306. Hold downs 312 and 314 serve to assure that the expandable polymeric material does not escape out of the top surfaces of the register box 302.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A plug apparatus for sealing an interior of a duct in a process for forming an insulated register box, the plug apparatus comprising:
   a frame;
   a shaft extending outwardly of said frame, said shaft having a cap at an end opposite said frame;
   a plurality of layers of flexible material radiating outwardly of said shaft adjacent to an end of said shaft opposite said frame, said plurality of layers of flexible material adapted to have an outer periphery bearing against an interior surface of the duct;
   a washer positioned on said shaft and interposed between the cap and said plurality of layers of flexible material, said washer being rigid, said washer having a diameter less than an outer diameter of said plurality of layers of flexible material; and
   a fastener affixed to said shaft on a side of said plurality of layers of flexible material opposite said washer, said fastener having a surface bearing against said plurality of layers of flexible material, said fastener having a diameter less than the outer diameter of said plurality of layers of flexible material.

2. The plug apparatus of claim 1, further comprising:
   a support surface having an opening formed therein, said shaft and said plurality of layers of flexible material positioned centrally of the opening of said support surface.

3. The plug apparatus of claim 1, said shaft having a cap at an end opposite said frame, the plug apparatus further comprising:
   a washer positioned on said shaft and interposed between the cap and said plurality of layers of flexible material, said washer being rigid, said washer having a diameter less than an outer diameter of said plurality of layers of flexible material.

4. The plug apparatus of claim 1, each layer of said plurality of layers of flexible material having an outer diameter greater than an inner diameter of the duct.

5. The plug apparatus of claim 1, said plurality of layers of flexible material being formed of neoprene.

6. An assembly for use in forming an insulated register box, the insulated register box having a box with a duct having a first portion extending into an interior of the box and a second portion extending outwardly of an exterior of the box, the assembly comprising:
   a support surface having an opening formed therein, the opening adapted to receive the duct of the register box therein;
   a frame affixed to said support surface;
   a shaft affixed to the portion of said frame and extending toward the opening; and
   a plurality of layers of flexible material radiating outwardly of said shaft adjacent an end of said shaft opposite the portion of said frame, said plurality of layers of flexible material adapted to have an outer periphery bearing against an inner wall of the duct; and
   a table having a surface thereon, said frame affixed to the surface of said table, said support surface located above the surface of said table.

7. The assembly of claim 6, said support surface having an upper surface adapted to allow a surface of the box of the register box to rest thereon.

8. The assembly of claim 6, the opening of said support surface having a diameter slightly greater than an outer diameter of the duct of the register box.

9. The assembly of claim 6, one leg of said frame being affixed to an underside of said support surface adjacent one side of the opening, another leg of said frame being affixed to the underside of said support surface cent an opposite side of the opening, the portion of said frame extending between the legs in generally parallel planar relationship to the underside of said support surface.

10. The assembly of claim 6, said shaft projecting toward a center of the opening.

11. The assembly of claim 6, said shaft having a cap at an end opposite said frame, the assembly further comprising:
   a washer interposed between the cap and said plurality of layers of flexible material, said washer being rigid, said washer having a diameter less than an outer diameter of said plurality of layers of flexible material.

12. The assembly of claim 6, each layer of said plurality of layers of flexible material having an outer diameter greater than an inner diameter of the duct.

13. The assembly of claim 6, said plurality of layers of flexible material being formed of a neoprene material.

14. An assembly for use in forming an insulated register box, the insulated register box having a box with a duct having a first portion extending into an interior of the box and a second portion extending outwardly of an exterior of the box, the assembly comprising:
   a support surface having an opening formed therein, the opening adapted to receive the duct of the register box therein;
   a frame affixed to said support surface;
   a shaft affixed to the portion of said frame and extending toward the opening;
   a plurality of layers of flexible material radiating outwardly of said shaft adjacent an end of said shaft opposite the portion of said frame, said plurality of layers of flexible material adapted to have an outer periphery bearing against an inner wall of the duct;
   a washer interposed between the cap and said plurality of layers of flexible material, said washer being rigid, said washer having a diameter less than an outer diameter of said plurality of layers of flexible material; and
   a fastener affixed to said shaft on a side of said plurality of layers of flexible material opposite said washer, said fastener having a surface bearing against said plurality of layers of flexible material, said fastener having a diameter less than the outer diameter of said plurality of layers of flexible material.

* * * * *